(12) United States Patent
Ni et al.

(10) Patent No.: US 11,971,802 B2
(45) Date of Patent: Apr. 30, 2024

(54) METHOD, ELECTRONIC DEVICE, AND COMPUTER PROGRAM PRODUCT FOR CODE DEFECT DETECTION

(71) Applicant: EMC IP Holding Company LLC, Hopkinton, MA (US)

(72) Inventors: Jiacheng Ni, Shanghai (CN); Rong Sheng, Shanghai (CN); Ke Shan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 140 days.

(21) Appl. No.: 17/541,371

(22) Filed: Dec. 3, 2021

(65) Prior Publication Data

US 2023/0128681 A1 Apr. 27, 2023

(30) Foreign Application Priority Data

Oct. 22, 2021 (CN) .......................... 202111235658.7

(51) Int. Cl.
*G06F 11/36* (2006.01)
*G06F 18/214* (2023.01)
*G06N 20/00* (2019.01)

(52) U.S. Cl.
CPC ...... *G06F 11/3604* (2013.01); *G06F 11/3688* (2013.01); *G06F 11/3692* (2013.01); *G06F 18/214* (2023.01); *G06N 20/00* (2019.01)

(58) Field of Classification Search
CPC ............. G06F 11/3604; G06F 11/3688; G06F 11/3692; G06F 18/214; G06N 20/00
See application file for complete search history.

(56) References Cited

U.S. PATENT DOCUMENTS

| 11,347,623 B1 * | 5/2022 | Yang ..................... G06F 11/302 |
| 2019/0235997 A1 * | 8/2019 | Mitchell .................. G06N 7/01 |

(Continued)

FOREIGN PATENT DOCUMENTS

CN 103514086 A * 1/2014

OTHER PUBLICATIONS

Huang et al. "A Software Error Report Extracting Method and Device" [English Translation of Chinese Patent Application Publication No. CN 103514086A] pp. 1-8 (Year: 2014).*

(Continued)

*Primary Examiner* — Ziaul A Chowdhury
(74) *Attorney, Agent, or Firm* — Ryan, Mason & Lewis, LLP

(57) ABSTRACT

Embodiments of the present disclosure provide a method, an electronic device, and a computer program product for code defect detection. The method described here includes determining log information associated with a defect based on the defect reported during testing of a software product. The method further includes determining a nature of the defect based on the log information. The method further includes determining, based on the nature, the log information, and a memory image file generated when the defect is reported, target code in code of the software product that causes the defect, in response to the nature indicating that the defect is caused by the code of the software product and needs to be repaired. By using the solution of the present application, different analysis strategies for defects may be adopted based on natures of the defects, thereby improving the efficiency of detecting code defects.

20 Claims, 4 Drawing Sheets

(56) References Cited

U.S. PATENT DOCUMENTS

2021/0263841 A1* 8/2021 Mo .................... G06F 11/3688
2021/0311853 A1* 10/2021 Shao .................. G06F 11/3604
2022/0283930 A1* 9/2022 Figueredo de Santana ................
G06F 11/3688

OTHER PUBLICATIONS

Dell Technologies, "Dell EMC PowerScale OneFS Operating System," White Paper, Apr. 2021, 13 pages.
XGBOOST Developers, "XGBoost Documentation," https://xgboost.readthedocs.io/en/stable/, Accessed Nov. 24, 2021, 2 pages.
The GDB Developers, "GDB: The GNU Project Debugger," https://www.gnu.org/software/gdb/, Oct. 8, 2021, 4 pages.

* cited by examiner

METHOD, ELECTRONIC DEVICE, AND COMPUTER PROGRAM PRODUCT FOR CODE DEFECT DETECTION

RELATED APPLICATION(S)

The present application claims priority to Chinese Patent Application No. 202111235658.7, filed Oct. 22, 2021, and entitled "Method, Electronic Device, and Computer Program Product for Code Defect Detection," which is incorporated by reference herein in its entirety.

FIELD

Embodiments of the present disclosure relate to the field of data processing, and more particularly, to a method, an electronic device, and a computer program product for code defect detection.

BACKGROUND

During development of a software product, it is necessary to test the software product to detect whether there is a code defect in the software product. Usually, test code may be used to test the software product in a test environment. A tester and a developer can detect and repair a code defect in the software product based on the defect reported during testing. However, the defect reported during testing may be caused by a variety of reasons, and analysis of the defect consumes extensive human resources. Therefore, there is a need for a method that can efficiently detect a defect in a software product.

SUMMARY

In a first aspect of the present disclosure, a method for code defect detection is provided. The method includes determining log information associated with a defect based on the defect reported during testing of a software product. The method further includes determining a nature of the defect based on the log information. The method further includes determining, based on the nature, the log information, and a memory image file generated when the defect is reported, target code in code of the software product that causes the defect, in response to the nature indicating that the defect is caused by the code of the software product and needs to be repaired.

In some embodiments of the first aspect, the nature includes at least one nature indicating at least one of the following: whether the defect is caused by the code of the software product; whether the defect is caused by test code used for testing the software product; whether the defect is caused by an environmental factor unrelated to the code of the software product and the test code, the environmental factor including at least one of network quality, power supply stability, and storage device quality; and whether the defect needs to be repaired.

In some embodiments of the first aspect, the log information associated with the defect includes determining at least one of the following: a log file generated based on reproduction of the defect, and a defect description file used for describing the defect.

In some embodiments of the first aspect, determining a nature of the defect includes: determining the nature of the defect by using a set of classification models, a classification model in the set of classification models being separately trained for each nature.

In some embodiments of the first aspect, the classification model is trained based on annotated training data, the training data including a plurality of defects with annotated natures collected from a defect tracking tool and a plurality of pieces of log information associated with the plurality of defects.

In some embodiments of the first aspect, determining target code in code of the software product that causes the defect includes: parsing the memory image file to determine memory state information associated with the defect; determining the target code based on the nature, the log information, and the memory state information.

In some embodiments of the first aspect, determining target code in code of the software product that causes the defect includes: determining the target code by using a machine learning model, the machine learning model being trained using annotated training data, the training data including a tested source code file collected from the defect tracking tool and a target source code file that causes the defect in the source code file.

In a second aspect of the present disclosure, an electronic device is provided. The electronic device includes a processor and a memory coupled to the processor, the memory having instructions stored therein which, when executed by the processor, cause the device to execute actions. The actions include determining log information associated with a defect based on the defect reported during testing of a software product. The actions further include determining a nature of the defect based on the log information. The actions further include determining, based on the nature, the log information, and a memory image file generated when the defect is reported, target code in code of the software product that causes the defect, in response to the nature indicating that the defect is caused by the code of the software product and needs to be repaired. In a third aspect of the present disclosure, a computer program product is provided. The computer program product is tangibly stored on a computer-readable medium and includes machine-executable instructions, wherein the machine-executable instructions, when executed by a machine, cause the machine to perform the method according to the first aspect.

In the embodiments of the present disclosure, with the solution of the present application, different analysis strategies for defects may be adopted based on natures of the defects, thereby improving the efficiency of detecting code defects.

This Summary is provided to introduce the selection of concepts in a simplified form, which will be further described in the Detailed Description below. The Summary is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent from the description below of example embodiments of the present disclosure, in combination with the accompanying drawings. In the example embodiments of the present disclosure, the same reference numerals generally represent the same parts.

DETAILED DESCRIPTION

Figure 1:
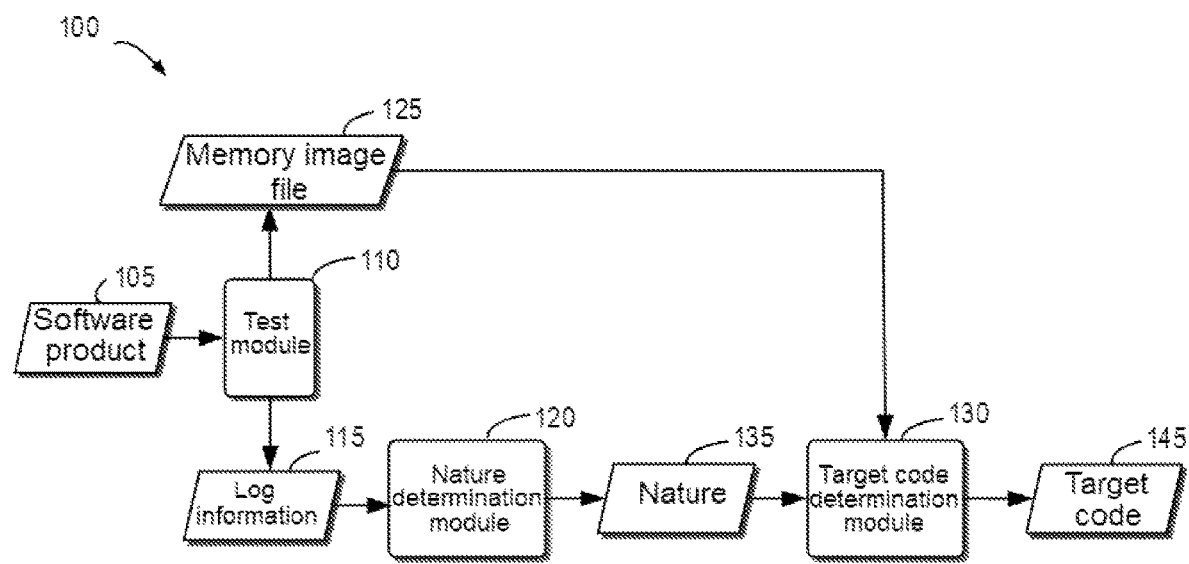
FIG. 1 shows a schematic diagram of an environment in which embodiments of the present disclosure can be implemented.

Principles of the present disclosure will be described below with reference to several example embodiments shown in the accompanying drawings. Although example embodiments of the present disclosure are illustrated in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" indicates "at least one additional embodiment." The terms "first," "second," and the like may refer to different or identical objects. Other explicit and implicit definitions may also be included below.

As mentioned above, there is a need for a method that can efficiently detect a defect in a software product. Usually, defect tracking tools (such as JIRA, AA, and Bugzilla) may be used for collecting defects and managing analysis and repair of the defects by testers and developers. However, these defect tracking tools cannot replace humans to analyze the reported defects, so it is difficult to effectively assist the testers and developers to detect, locate, and repair defects in software products.

Illustrative embodiments of the present disclosure provide a solution for code defect detection. In the solution, log information associated with a defect is determined based on the defect reported during testing of a software product. The solution further includes determining a nature of the defect based on the log information. The solution further includes determining, based on the nature, the log information, and a memory image file generated when the defect is reported, target code in code of the software product that causes the defect, in response to the nature indicating that the defect is caused by the code of the software product and needs to be repaired.

In this way, by first determining the nature of the defect and then further determining the defect in the software product based on the nature of the defect, the defect can be detected step by step, thereby improving the efficiency of analyzing and detecting the defect. For example, for a defect that has a nature indicating that the defect does not need to be repaired, further analysis may not be required. Therefore, substantial time and resources may be saved.

The basic principles and several example embodiments of the present disclosure are described below with reference to FIG. 1 to FIG. 4. It should be understood that these example embodiments are provided merely to enable those skilled in the art to better understand and then implement embodiments of the present disclosure, and are not intended to impose any limitation to the scope of the present disclosure.

FIG. 1 shows environment 100 in which the embodiments of the present disclosure can be implemented. As shown in FIG. 1, environment 100 includes test module 110, nature determination module 120, and target code determination module 130. Test module 110 may use test code to test software product 105 in a test environment. For example, test module 110 may use test cases to detect code of software product 105.

During the test, test module 110 may report a defect and output log information 115 associated with the defect. A tester may analyze the reported defect by analyzing log information 115. Log information 115 may include a log file associated with the defect. Test module 110 may generate one or more log files associated with the defect by reproducing the defect one or more times.

Alternatively or additionally, log information 115 may include a defect description file used for describing the defect. The defect description file may include one or more pieces of the following information: a defect ID, a defect state (such as to be resolved, not needed to be resolved, and repaired), a defect title, a detailed description of the defect, a degree of severity of the defect, a degree of urgency of the defect, a defect submitter, a defect submission time, and the like. The defect description file may be extracted based on the log file. Alternatively or additionally, the tester can manually write the defect description file.

In some implementations, when the program is abnormally interrupted due to an error, an operating system stores the current state of the work of the program as a core dump file. The core dump file may contain memory information, register state, stack pointer, memory management information, and the like during running of the program. In this case, test module 110 may also parse the core dump file by using a memory image analysis tool, and output memory image file 125 obtained by the parsing. Memory image file 125 generated when the defect is reported may reflect the memory information, register state, stack pointer, memory management information, and the like associated with the defect.

Nature determination module 120 may determine nature 135 of the defect based on log information 115. The nature of the defect may include natures indicating various types of information. Nature 135 of the defect may indicate whether the defect is caused by code of the software product. Alternatively or additionally, nature 135 of the defect may indicate whether the defect is caused by test code used for testing the software product. Alternatively or additionally, nature 135 of the defect may indicate whether the defect is caused by an environmental factor unrelated to the code of the software product and the test code. The environmental factor may include the network quality, power supply stability, storage device quality, and so on. Alternatively or additionally, nature 135 of the defect may indicate whether the defect needs to be repaired.

In response to nature 135 of the defect indicating that the defect is caused by the code of software product 105 and needs to be repaired, target code determination module 130 determines, based on determined nature 135 of the defect, log information 115, and memory image file 125, target code 145 that causes the defect in software product 105. Target code 145 is one or more source code files among source code files of software product 105.

Test module 110, nature determination module 120, and target code determination module 130 may be implemented by any computing device including a general computing device. One or more of test module 110, nature determination module 120, and target code determination module 130 may be implemented by the same computing device. Components of a computing device may include, but are not limited to, one or more processors or processing units, memories, storage devices, one or more communication units, one or more input devices, and one or more output devices. These components may be integrated on a single device or may be arranged in the form of a cloud computing architecture.

It should be understood that environment 100 shown in FIG. 1 is merely an example and should not constitute any limitation to the functions and scope of the implementations described in the present disclosure. For example, nature determination module 120 may also be integrated with target code determination module 130.

Figure 2:
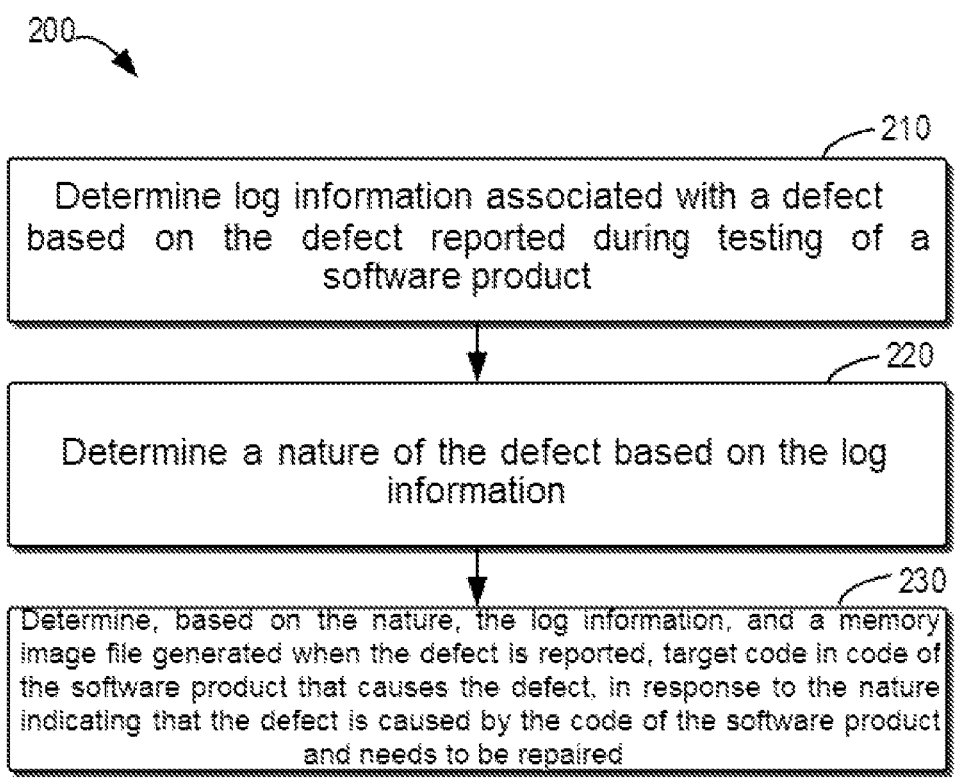
FIG. 2 shows a flowchart of an example method for code defect detection according to some embodiments of the present disclosure.

FIG. 2 shows a flowchart of example method 200 for code defect detection according to an embodiment of the present disclosure. Method 200 can be implemented, for example, in environment 100 as shown in FIG. 1. It should be understood that method 200 may also include additional actions not shown and/or may omit actions shown, and the scope of the present disclosure is not limited in this regard.

At block 210, test module 110 determines log information 115 associated with a defect based on the defect reported during testing of software product 105. Test module 110 may acquire a log file associated with the defect by reproducing the defect multiple times. Log information 115 may also include a defect description file associated with the defect.

At block 220, nature determination module 120 determines nature 135 of the defect based on log information 115. In some implementations, nature determination module 120 may determine nature 135 of the defect by using a machine learning model. For example, nature determination module 120 may determine nature 135 of the defect by using a classification model.

As described above, nature 135 of the defect may include multiple natures indicating various types of information. The nature may indicate yes or no. The nature may also indicate a probability. For example, the nature may indicate whether the defect is caused by code of software product 105. The nature may also indicate a probability that the defect is caused by the code of software product 105.

Nature determination module 120 may determine a corresponding nature by using a classification model for each nature. Each classification model is trained separately for the corresponding nature. For example, nature determination module 120 may determine, by using a first classification model, whether the reported defect is caused by the code of software product 105. Nature determination module 120 may determine, by using a second classification model, whether the reported defect is caused by test code. Nature determination module 120 may also determine, by using a third classification model, whether the reported defect is caused by an environmental factor. Alternatively or additionally, nature determination module 120 may determine nature 135 of the defect by using a classification model capable of determining a plurality of natures.

In some implementations, the classification model may be a logistic regression model. Alternatively or additionally, the classification model may be an XGBoost model. The classification model may be any suitable model, and the scope of the present disclosure is not limited herein.

In some implementations, annotated training data may be used to train the classification model. Reported historical defects and historical log information related to the historical defects may be collected from a defect tracking tool as training data. Examples of the defect tracking tool may include JIRA, Bugzilla, and the like. The collected historical log information may include historical log files and historical defect description files for the collected historical defects.

In some implementations, a label assigned by a tester to a historical defect may be used as an annotation of the nature of the historical defect. For example, during training of the second classification model for the nature indicating whether the defect is caused by the test code, a historical defect considered to be caused by the test code in the historical defect description file may be annotated as 1 (Yes). Similarly, during training of the first classification model for the nature indicating whether the defect is caused by the code of the software product, a historical defect considered to be caused by the test code in the historical defect description file may be annotated as 0 (No).

In some implementations, a mapping rule may be used to determine the annotation of the nature of the historical defect based on the label of the historical defect. Examples of labels for historical defects may include test code (indicating that the defect is caused by the test code), product code (indicating that the defect is caused by the code of the software product), functional branch (indicating that the defect is caused by a functional branch), environmental factor (indicating that the defect is caused by an environmental factor), non-reproducible (indicating that the defect is not reproducible), repaired (indicating that the defect has been repaired), repairing not required (indicating that the defect does not need to be repaired within a threshold time period), and the like.

The mapping rule may specify that the nature of the historical defect with a label of test code is annotated as the test code. Additionally, the mapping rule may specify that the nature of the historical defect with a label of product code and functional branch is annotated as the product code. Additionally, the mapping rule may specify that the nature of the historical defect with a label of environmental factor is annotated as the environmental factor. Additionally, the mapping rule may specify that the nature of the historical defect with a label of environmental factors is annotated as repairing not required.

Additionally, the mapping rule may specify that the nature of the historical defect with a non-reproducible label is annotated as a non-environmental factor. Additionally, the mapping rule may specify that the nature of the historical defect with a non-reproducible label is annotated as requiring no repair. Additionally, the mapping rule may specify that the nature of the historical defect with a repaired label is annotated as repairing required.

In this way, using the historical defects and the associated historical log information collected from the defect tracking tool, a model for determining nature 135 of the defect may be trained. With the trained model, nature 135 of the defect may be determined based on log information 115 associated with the defect reported during the testing of software product 105.

At block 230, in response to nature 135 of the defect indicating that the defect is caused by the code of software product 105 and needs to be repaired, target code determination module 130 determines, based on nature 135 of the defect, log information 115, and memory image file 125 generated when the defect is reported, target code 145 that causes the defect in the code of software product 105.

In some implementations, if nature 135 of the defect indicates that the defect is not caused by the code of software product 105, target code determination module 130 may not output target code 145, but instead may output a report indicating that no further analysis of the defect is required.

Additionally, if nature 135 of the defect indicates that the defect does not need to be repaired, target code determination module 130 may not output target code 145, but instead may output a report indicating that no further analysis of the defect is required.

Target code determination module 130 may provide a report to a tester to guide the tester to stop analyzing the defect. In this way, the resource consumption for the tester to analyze the defect can be reduced, thereby improving the efficiency of detecting code defects.

In some implementations, in response to nature 135 of the defect indicating that the defect is caused by the code of software product 105 and needs to be repaired, target code determination module 130 may determine target code 145 by using a machine learning model.

The machine learning model may be trained by using annotated training data. The training data may include tested historical source code files collected from the defect tracking tool and historical target source code files that caused defects in the historical source code files. Target code determination module 130 may determine target code 145 by using any suitable model, and the scope of the present disclosure is not limited herein.

In this way, according to the solution of the present disclosure, the nature of the defect may be determined first, and then the defect in the software product may be further determined based on the nature of the defect. Different analysis strategies may be adopted based on the nature of the defect. In this way, the efficiency of analyzing and detecting defects can be improved. For example, for the defect with a nature indicating that the defect does not need to be repaired, further analysis may not be performed to save resources.

Figure 3:
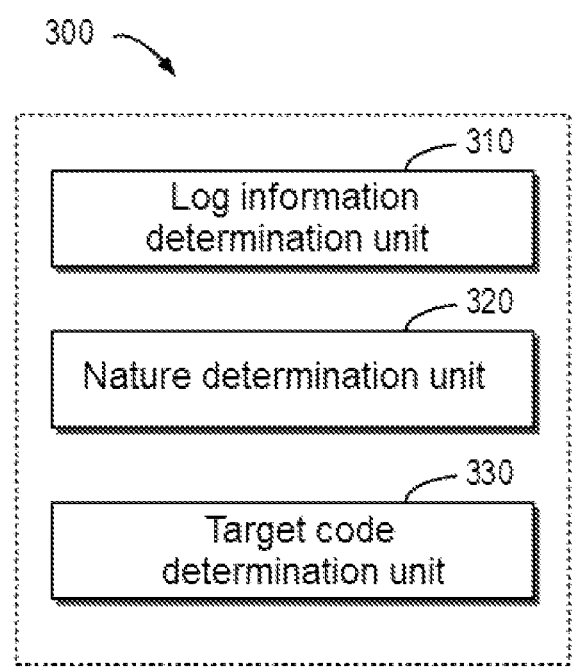
FIG. 3 shows a schematic diagram of an apparatus for code defect detection according to some embodiments of the present disclosure.

FIG. 3 shows a schematic diagram of apparatus 300 for code defect detection according to an embodiment of the present disclosure. Apparatus 300 may include a plurality of units, for performing corresponding steps in method 200 as illustrated in FIG. 2. As shown in FIG. 3, apparatus 300 includes log information determination unit 310 configured to determine log information associated with a defect based on the defect reported during testing of a software product; nature determination unit 320 configured to determine the nature of the defect based on the log information; and target code determination unit 330 configured to determine, based on the nature, the log information, and a memory image file generated when the defect is reported, target code in code of the software product that causes the defect, in response to the nature indicating that the defect is caused by the code of the software product and needs to be repaired.

It should be understood that the units in apparatus 300 can implement part or all of the functions of test module 110, nature determination module 120, and target code determination module 130 shown in FIG. 1. For example, log information determination unit 310 may implement part of the functions of test module 110. Alternatively, log information determination unit 310 may not implement the function of testing software product 105.

Figure 4:
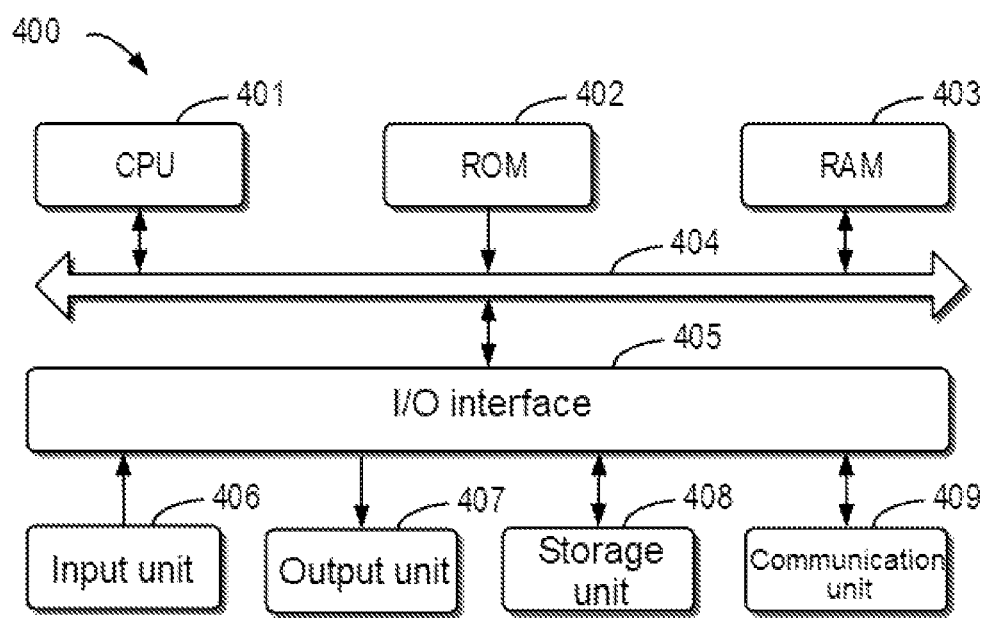
FIG. 4 shows a block diagram of an example computing device that may be configured to implement embodiments of the present disclosure.

FIG. 4 shows a schematic block diagram of example device 400 that may be configured to implement embodiments of the present disclosure. For example, device 400 may be implemented at environment 100 as shown in FIG. 1. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A number of components in device 400 are connected to I/O interface 405, including: an input unit 406, such as a keyboard and a mouse; an output unit 407, such as various types of displays and speakers; a storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, such as method 200, may be performed by CPU 401. For example, in some embodiments, method 200 may be implemented as a computer software program that is tangibly included in a machine-readable medium such as storage unit 408. In some embodiments, part of or all the computer programs may be loaded and/or installed onto device 400 via ROM 402 and/or communication unit 409. When the computer program is loaded into RAM 403 and executed by CPU 401, one or more actions of method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), an SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block of the flowcharts and/or the block diagrams and combinations of blocks in the flowcharts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method of code defect detection, comprising:
   determining log information associated with a defect based on the defect reported during testing of a software product;
   determining a nature of the defect based on the log information; and
   determining, based on the nature, the log information, and a memory image file generated when the defect is reported, target code in code of the software product that causes the defect, in response to the nature indicating that the defect is caused by the code of the software product and needs to be repaired;
   wherein determining a nature of the defect based on the log information comprises determining the nature of the defect by using a set of classification models; and
   wherein determining the nature of the defect by using the set of classification models comprises one or more of using a first classification model to determine whether the reported defect is caused by the code of the software product, using a second classification model to determine whether the reported defect is caused by test code used for testing the software product, and using a third classification model to determine whether the reported defect is caused by an environmental factor that is unrelated to the code of the software product and the test code used for testing the software product.

2. The method according to claim 1, wherein the nature comprises at least one nature indicating at least one of the following:
   whether the defect is caused by the code of the software product;
   whether the defect is caused by the test code used for testing the software product;

whether the defect is caused by the environmental factor unrelated to the code of the software product and the test code, the environmental factor comprising at least one of network quality, power supply stability, and storage device quality; and whether the defect needs to be repaired.

3. The method according to claim 1, wherein the log information associated with the defect comprises determining at least one of the following:

a log file generated based on reproduction of the defect, and a defect description file used for describing the defect.

4. The method according to claim 1, wherein a given classification model in the set of classification models is separately trained for each of a plurality of different defect natures.

5. The method according to claim 4, wherein the given classification model is trained based on annotated training data, the training data comprising a plurality of defects with annotated natures collected from a defect tracking tool and a plurality of pieces of log information associated with the plurality of defects.

6. The method according to claim 1, wherein determining target code in code of the software product that causes the defect comprises:

determining the target code by using a machine learning model, the machine learning model being trained using annotated training data, the training data comprising a tested source code file collected from a defect tracking tool and a target source code file that causes the defect in the source code file.

7. The method according to claim 1, wherein determining target code in code of the software product that causes the defect comprises:

parsing the memory image file to determine memory state information associated with the defect; and determining the target code based on the nature, the log information, and the memory state information.

8. An electronic device, comprising:

a processor; and a memory coupled to the processor, the memory having instructions stored therein, and the instructions, when executed by the processor, causing the electronic device to perform actions comprising:

determining log information associated with a defect based on the defect reported during testing of a software product;

determining a nature of the defect based on the log information; and determining, based on the nature, the log information, and a memory image file generated when the defect is reported, target code in code of the software product that causes the defect, in response to the nature indicating that the defect is caused by the code of the software product and needs to be repaired;

wherein determining a nature of the defect based on the log information comprises determining the nature of the defect by using a set of classification models; and wherein determining the nature of the defect by using the set of classification models comprises one or more of using a first classification model to determine whether the reported defect is caused by the code of the software product, using a second classification model to determine whether the reported defect is caused by test code used for testing the software product, and using a third classification model to determine whether the reported defect is caused by an environmental factor that is unrelated to the code of the software product and the test code used for testing the software product.

9. The electronic device according to claim 8, wherein the nature comprises at least one nature indicating at least one of the following:

whether the defect is caused by the code of the software product;

whether the defect is caused by the test code used for testing the software product;

whether the defect is caused by the environmental factor unrelated to the code of the software product and the test code, the environmental factor comprising at least one of network quality, power supply stability, and storage device quality; and whether the defect needs to be repaired.

10. The electronic device according to claim 8, wherein the log information associated with the defect comprises determining at least one of the following:

a log file generated based on reproduction of the defect, and a defect description file used for describing the defect.

11. The electronic device according to claim 8, wherein a given classification model in the set of classification models is separately trained for each of a plurality of different defect natures.

12. The electronic device according to claim 11, wherein the given classification model is trained based on annotated training data, the training data comprising a plurality of defects with annotated natures collected from a defect tracking tool and a plurality of pieces of log information associated with the plurality of defects.

13. The electronic device according to claim 8, wherein determining target code in code of the software product that causes the defect comprises:

determining the target code by using a machine learning model, the machine learning model being trained using annotated training data, the training data comprising a tested source code file collected from a defect tracking tool and a target source code file that causes the defect in the source code file.

14. A computer program product tangibly stored on a non-transitory computer-readable medium and comprising machine-executable instructions, wherein the machine-executable instructions, when executed by a machine, cause the machine to perform a method of code defect detection, the method comprising:

determining log information associated with a defect based on the defect reported during testing of a software product;

determining a nature of the defect based on the log information; and determining, based on the nature, the log information, and a memory image file generated when the defect is reported, target code in code of the software product that causes the defect, in response to the nature indicating that the defect is caused by the code of the software product and needs to be repaired;

wherein determining a nature of the defect based on the log information comprises determining the nature of the defect by using a set of classification models; and wherein determining the nature of the defect by using the set of classification models comprises one or more of using a first classification model to determine whether the reported defect is caused by the code of the software product, using a second classification model to determine whether the reported defect is caused by test code used for testing the software product, and using a third classification model to determine whether the reported defect is caused by an environmental factor that is unrelated to the code of the software product and the test code used for testing the software product.

15. The computer program product according to claim 14, wherein the nature comprises at least one nature indicating at least one of the following:
   whether the defect is caused by the code of the software product;
   whether the defect is caused by the test code used for testing the software product;
   whether the defect is caused by the environmental factor unrelated to the code of the software product and the test code, the environmental factor comprising at least one of network quality, power supply stability, and storage device quality; and
   whether the defect needs to be repaired.

16. The computer program product according to claim 14, wherein the log information associated with the defect comprises determining at least one of the following:
   a log file generated based on reproduction of the defect, and
   a defect description file used for describing the defect.

17. The computer program product according to claim 14, wherein a given classification model in the set of classification models is separately trained for each of a plurality of different defect natures.

18. The computer program product according to claim 17, wherein the given classification model is trained based on annotated training data, the training data comprising a plurality of defects with annotated natures collected from a defect tracking tool and a plurality of pieces of log information associated with the plurality of defects.

19. The computer program product according to claim 14, wherein determining target code in code of the software product that causes the defect comprises:
   determining the target code by using a machine learning model, the machine learning model being trained using annotated training data, the training data comprising a tested source code file collected from a defect tracking tool and a target source code file that causes the defect in the source code file.

20. The computer program product according to claim 14, wherein determining target code in code of the software product that causes the defect comprises:
   parsing the memory image file to determine memory state information associated with the defect; and
   determining the target code based on the nature, the log information, and the memory state information.

* * * * *